United States Patent [19]

Daugherty et al.

[11] 3,783,914

[45] Jan. 8, 1974

[54] STUMP CUTTER

[76] Inventors: James T. Daugherty; James J. Baber, Jr., both of P.O. Box 668, Valley, Nebr. 68064

[22] Filed: June 22, 1972

[21] Appl. No.: 265,418

[52] U.S. Cl.................. 144/2 N, 144/252, 144/235
[51] Int. Cl... A01g 23/06, B27g 21/00, B27g 13/08
[58] Field of Search.................... 144/2 N, 2 R, 218, 144/235, 251, 252; 30/379; 83/928, 795

[56] References Cited
UNITED STATES PATENTS

| 3,123,112 | 3/1964 | Hodges et al. | 144/2 N |
| 2,635,649 | 4/1953 | Brownlee | 30/379 |
| 3,119,602 | 1/1964 | Johnson | 144/252 R |
| 2,992,664 | 7/1961 | DeShano | 144/2 N X |
| 3,004,568 | 10/1961 | Wachtel | 144/2 N |

FOREIGN PATENTS OR APPLICATIONS

| 567,182 | 12/1932 | Germany | 144/252 |

Primary Examiner—Donald R. Schran
Attorney—H. Robert Henderson et al.

[57] ABSTRACT

A manually operated stump cutter is disclosed including an elongated tubular frame member with an engine mounted at one end and a cutting means at the other end. An operator handle extends from the other end and a shield assembly protects the operator. The tubular frame member is supported by a pair of wheels on a transverse axle midway of the tubular frame member.

5 Claims, 6 Drawing Figures

PATENTED JAN 8 1974   3,783,914
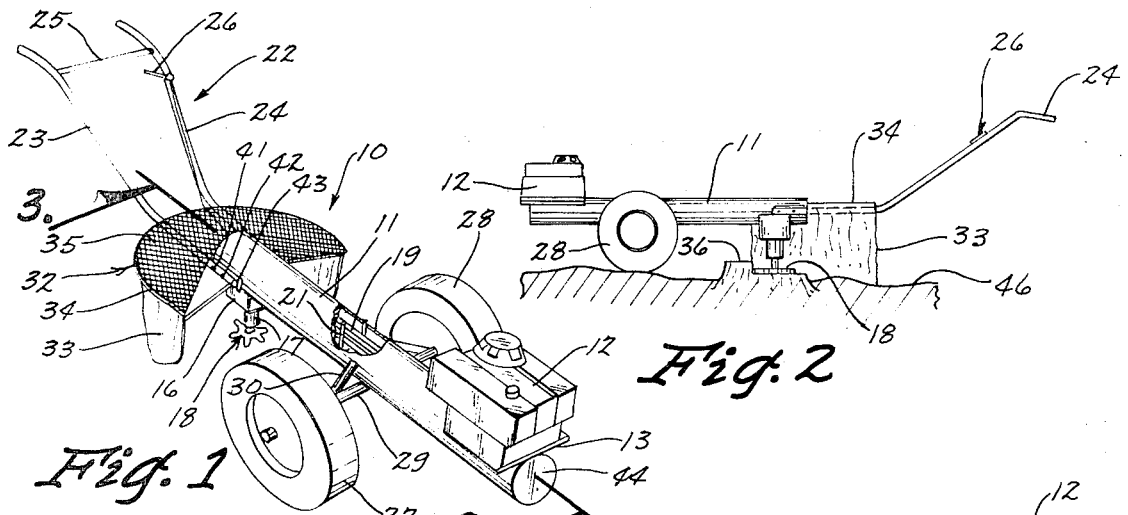
Fig. 1
Fig. 2
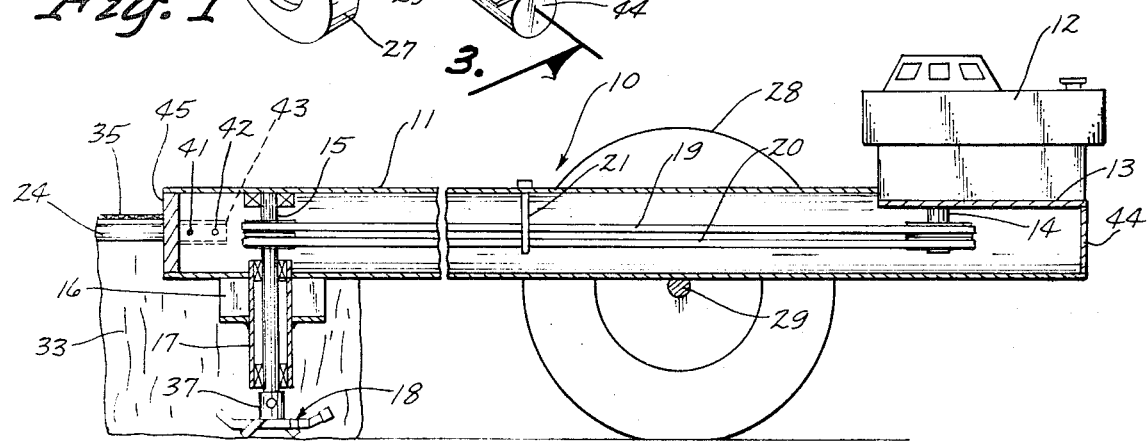
Fig. 3
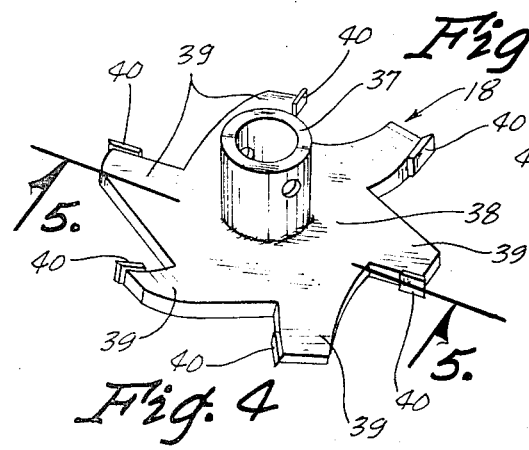
Fig. 4
Fig. 5
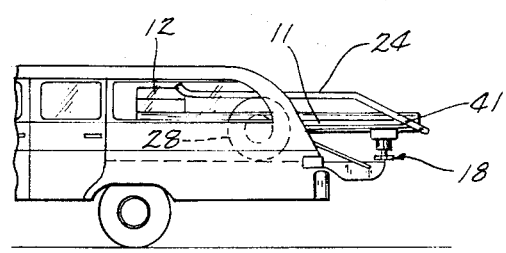
Fig. 6

STUMP CUTTER

BACKGROUND OF THE INVENTION

This invention relates to devices commonly referred to as stump cutters.

In clearing land for various purposes, it is often desirable to not only cut trees down but to remove the stump to a depth of several inches below ground level. Various types of machines have been developed for this purpose, as exemplified by U.S. Pat. Nos. 2,601,366; 2,671,478; 2,825,370 and 2,912,022.

In addition to the above, manually operated stump cutters supported by a pair of wheels are described in U.S. Pats. 1,460,617; 3,123,112 and 3,336,958. The present invention is directed to a stump cutter of the wheel supported, manually operated type.

While a variety of wheel supported, manually operated stump cutters have been available for some time, prior to this invention there has been no stump cutter available which provides the features of ease of operation, convenience and safety realized by the stump cutter of the present invention.

SUMMARY OF THE INVENTION

According to this invention, a stump cutter is provided which has an elongated tubular frame member with an engine at one end, a cutting means at the other, and a supporting axle and wheels therebetween. The cutting means is driven by means extending through the tubular frame member. An operator handle means is provided at the end having the cutting means, and a protective shield assembly is provided between the cutting means and the operator position.

It is an object of this invention to provide an improved stump cutter.

It is a further object to provide a stump cutter that is compact and safe.

That these and other objects and advantages are obtained by the present invention will be apparent from the following detailed description of a preferred embodiment.

BRIEF DESCRIPTION OF THE DRAWINGS

FIG. 1 is a perspective view showing a stump cutter in accordance with the invention.

FIG. 2 is a side elevational view showing the stump cutter in operation.

FIG. 3 is an enlarged cross-sectional view taken along the line 3—3 of FIG. 1 in the direction of the arrows.

FIG. 4 is a perspective view of a preferred form of cutting means.

FIG. 5 is a cross-sectional view taken along the line 5—5 of FIG. 4 in the direction of the arrows.

FIG. 6 is a side elevational view showing the stump cutter handle in the folded over position to illustrate how it might be transported in a station wagon.

DESCRIPTION OF THE PREFERRED EMBODIMENT

A preferred embodiment of the invention is described in detail below, reference being made to the several views of the drawings. It should be understood that the following is exemplary of a stump cutter in accordance with the invention, and numerous variations and modifications could be made of the device as described.

Referring to the drawings, a stump cutter in accordance with the invention is shown generally as 10. The stump cutter 10 has a tubular member 11 on which an engine 12 is mounted. The engine 12 is positioned at one end of frame member 11 and is attached by conventional means (not shown) to a mounting plate 13 which in turn is welded or otherwise attached to frame member 11. Extending from engine 12 to the interior of frame member 11 (FIG. 3) is a drive shaft 14. At the other end of frame member 11 a driven shaft 15 is interiorly mounted, and extends downwardly through bracket 16 and bearing support 17 which are attached to frame member 11. At the lower end of driven shaft 15 a cutting means 18 is attached. A pair of drive belts 19 and 20 extend over suitable sheaves fixed to drive shaft 14 and driven shaft 15 to effect rotation of the cutting means 18. It should be noted that this arrangement allows the entire drive system between the engine 12 and cutting means 18 to be enclosed, protecting same from exposure to the elements, but more importantly protecting against the possibilty of extraneous matter, or an operator, becoming entangled in the drive system. Thus, a significant advantage in reliability and safety is provided. End plugs 44 and 45 may be placed in each end of tubular frame member 11. As shown in FIGS. 1 and 3, a belt guide 21 is provided within frame member 11 to reduce or eliminate whipping or distortion of the drive belts.

In FIG. 1, an operator handle means 22 includes half handles 23 and 24 braced by cross member 25. On one of the half handles, a throttle control 26 is mounted for convenience. In the normal case where engine 12 is a pull-start gasoline engine, the end of a starter rope (not shown) may be positioned near the cross member 25 so that an operator can start the engine from the operating position.

The stump cutter 10 is supported at or near its center of gravity by a pair of wheels 27 and 28, one at each end of an axle 29 mounted transversely of the frame member 11. A pair of supporting gussets 30 and 31 (FIG. 1) provide rigidity to the structure.

A protective shield assembly 32 is located at the handle end of frame member 11 and provides protection against cuttings being thrown toward the operator's position. The shield assembly 32 includes a flexible skirt 33 depending from an arcuate member 34 (FIG. 1). The skirt 33 must be flexible for reasons which will be apparent from the description of the operation of the device. The upper part of the shield assembly is illustrated in FIG. 1 as a wire mesh element 35. The operator can look through the mesh element 35 and see the cutting means 18 in contact with a stump 36 (FIG. 2) during operation, thus allowing the operator to observe the cutting action without endangering his eyes. The screen 35 could be made of transparent plastic or other suitable material instead of a wire mesh as shown, the important thing being that the operator is safely able to observe the operation of the cutting means 18.

The preferred version of cutting means 18 is illustrated in FIGS. 4 and 5. A collar 37 is welded to cutter plate 38 and attachable by conventional means to the lower end of driven shaft 15. A series of cutting arms 39 extend outwardly from cutter plate 38 and alternately extend above, below, and level with, the cutter plate 38. Hardened cutting tips 40 are connected to the outer extremities of the cutting arms 39. The cutout openings between adjacent cutter arms assist in minimizing the throwing of cuttings during operation.

The handle means 22 is connected to the frame member 11 by a pair of bolts 41 and 42 extending through each half handle 23 and 24 and frame member 11. A channel piece 43 may be welded to opposed sides of frame member 11 for locating the half handles in position and strengthening the connection. When the stump cutter is to be transported or stored, one of the bolts 41 or 42 is removed, the other bolt is loosened, and the handle means 22 is pivoted forwardly over the frame member 11 as illustrated in FIG. 6, allowing the stump cutter to be transported or stored with a minimum space requirement.

The operation of the device will now be described, referring particularly to FIG. 2 which shows a stump 36 which is to be removed to a level 6 to 10 inches below the ground surface 46.

The engine 12 is started, in turn rotating the cutting means 18. The cutting means 18 is positioned over a portion of the stump 36 by manipulation of the handle means 22 and wheels 27 and 28. The cutting means 18 is then lowered into contact with stump 36 and manipulated over the entire stump 36 by appropriate movement of handle means 22. Continued cutting of the stump to several inches below surface level may be continued until the frame member 11 or handle means 22 contacts the ground surface 46. The skirt 33, being flexible, does not prevent downward movement of the cutting means below ground level, but maintains a protective barrier between cutting means 18 and the operator at all times. The location of the cutting means 18 at the handle end of the device, combined with the "see-through" feature of upper shield 35, allows the operator to observe the operation of the cutting means against the stump throughout the operation. Upon completion of the stump removal, the engine is shut down and the cutter is moved to the next stump to be removed, or is collapsed for transporting or storing.

A stump cutter has been described above which provides unique safety features and improved operation due to the unique construction thereof. Minor changes in certain parts of the device as described could obviously be made without departing from the true scope of the invention, which is to be defined by the appended claims.

We claim:
1. A stump cutter comprising:
   a tubular frame member;
   an engine mounted on top of the tubular frame member near a first end thereof and including a drive shaft depending into the tubular frame member;
   a pair of ground engaging wheels mounted transversely to the tubular frame member at approximately the center of gravity of the stump cutter;
   a vertically disposed driven shaft mounted near a second end of the tubular frame member and having cutting means attached thereto, the driven shaft being operatively connected to the engine drive shaft by drive means extending through and completely enclosed by the tubular frame member;
   operating handle means extending beyond the second end of the tubular frame member; and
   a shield assembly disposed about the cutting means and adapted to protect an operator.

2. A stump cutter as defined in claim 1 wherein the shield assembly includes a flexible skirt portion depending downwardly and extending about a substantial portion of the cutting means, and an upper protective screen through which the cutting means is visible.

3. A stump cutter as defined in claim 1 wherein the drive means comprises a pair of drive belts, and a belt guide is disposed midway in the tubular frame member.

4. A stump cutter as defined in claim 1 wherein the operating handle means includes a pair of handle halfs connected to the second end of the tubular frame member by a pair of bolts, the operating handle means being adapted to be folded over the tubular frame member upon removal of one of the pair of bolts and loosening of the other of the pair of bolts.

5. A stump cutter as defined in claim 1 wherein the cutting means includes a cutter plate and alternating upwardly, horizontally, and downwardly disposed, integrally formed cutting arms, the cutting arms having hardened tips, and the cutter plate having an opening formed between each adjacent pair of arms whereby the throwing of cuttings is minimized.

* * * * *